United States Patent Office 3,039,886
Patented June 19, 1962

3,039,886
OPAQUE WATER COLOR COMPOSITIONS AND METHOD OF MAKING SAME
Alexander S. Masley, 1010 Sierra Drive SE., Albuquerque, N. Mex.
No Drawing. Filed July 22, 1960, Ser. No. 44,542
12 Claims. (Cl. 106—209)

This invention relates to artist's brush paints and more particularly to solid, opaque color preparations in compressed shaped form which are readily mixed with water for use.

The compressed shaped color compositions of the present invention are an improvement over the artist's water paint tablet described and claimed in my earlier United States Patent No. 2,822,281. In this prior patent the artist's water paint tablet is composed of a dry mixture of coloring pigment, acacia powder, starch powder and an organic acid, such as citric acid or tartaric acid which is capable of reacting with the whiting to provide a quick disintegrating tablet in water without the visible formation of effervescence or bubbling. The amount of acid present in the tablet is controlled to provide between 0.02–0.04 equivalents of hydrogen per 100 grams of total dry mixture, these equivalents of hydrogen ion released by contacting the mixture with water. Also, the whiting is present in excess in the tablet relative to the amount required for chemical reaction with the organic acid which is present.

An essential ingredient of the quick dissolving paint tablet of my prior patent is a solution of sorbitol in water present in an amount of from 2–5% by weight of the dry mixture, this solution fulfilling the function of stabilizing the organic acid in the presence of high humidity and thereby preventing its decomposition in the dry tablet. The dry tablet was formed at relatively low pressure of less than 200 pounds per square inch and the resulting tablet was a porous compact whose characteristic of easy dispersibility in water was due in part to the porosity resulting from the formulation and forming operations. In contrast, the tablet of the present invention is stronger and substantially non-porous while surprisingly exhibiting the characteristic of easy dispersibility in water despite its non-porous and dense characteristics.

The composition of the present invention differs radically from the composition of my prior patent in (1) eliminating organic acid, (2) in eliminating sorbitol as the organic acid stabilizer and (3) in utilizing an alkali metal borate such as sodium metaborate or sodium tetraborate for example in critical proportions with gum acacia or gum tragacanth whereby there is produced a substantially instantaneously dissolving non-hygroscopic paint tablet which is non-toxic and which has improved mechanical strength as compared with the paint tablets of my prior patent. In this mixture starch merely serves as a solubilizing assistant.

The tablets of the present invention are produced under much higher pressures than those in my earlier patent and are therefore quite dense, e.g., under pressures as are used in typical commercial tableting machines varying from about 2500 pounds per square inch to about 20,000 pounds per square inch in contrast to porous light tablets produced under a pressure of less than 200 pounds per square inch in my prior patent. Thereby the mechanical strength properties and maximum pigment concentration per unit size are superior in my new tablets of the present invention while encountering no loss in substantially instantaneous dissolving or dispersing of the tablet in water.

Formulation is easier with the present composition than with the composition of my prior patent since no adjustment is necessary for acid and sorbitol and physical mixing is an easier operation due to the unique physical action of the alkali metal borate on gum acacia and gum tragacanth. By adding alkali metal borate to the dry mixture of opaque pigment (such as titanium dioxide) extender (whiting) and finely divided gum acacia or gum tragacanth, preferably alkali metal borate in dilute aqueous solution to enhance mixing, the gum first swells in the presence of water, then appears to dissolve slightly whereafter the mixture sets to a dry hard condition which redissolves or disperses substantially instantly in water. Based upon the amount of finely divided gum present and upon the total of pigment and extender, the amount of alkali metal borate which converts the gum binder into an enhanced colloidal quick dissolving or quick dispersing condition for disseminating the pigment and extender into water ranges from about 2% to about 40% preferably from 5% to about 20% based upon the weight of the gum and from about 0.1% to about 1.2%, preferably 0.3–1% based upon the weight of pigment and extender. The gum binder varies from about 1.2 to about 8%, preferably from about 4 to about 10% by weight of pigment and binder, larger amounts than 10% with most pigments and extenders being uneconomical, unnecessary and sometimes causing undesirable stickiness so as to make the paint difficult to apply, whereas smaller amounts are not sufficient to provide in combination with the alkali borate the desirable dispersing and disintegrating action for the pigment and extender when the pressed tablet is mixed with water. For some types of dyes and pigments which are difficult to disperse in water because of their oleophilic and hydrophobic surface characteristics larger amounts of gum may be warranted but in most cases of pigment selection the foregoing proportions of gum are entirely adequate.

Due to the small amount of alkali metal borate which is required for interaction with the gum which is nontoxic, the combination of gum and borate is for all practical purposes non-toxic. Since the selection of nontoxic pigments and extenders is well recognized in the art for the production of artist's paint supplies utilized by children at home and students in the class room undergoing painting experience and training, it is obvious that the composition of the present invention is non-toxic and eminently suitable for these purposes. No poisons or other matter which can affect the human body, such as oxalic acid are used.

In contrast to the large variety of paint mixtures of various quantities prepared for young individuals or for group instruction which have been available heretofore, it is, to the best of my knowledge, only the paint tablet of my prior patent and that of the present invention which eliminate the chore of careful parceling out of different needed colors by parent or teacher to the child, a task not capable of being delegated to less experienced hands. The commercially available powders have been unsatisfactory for children due to waste and accidental spilling. It is not uncommon to find powder paints to which water has been added and worked into paste form developing a disagreeable odor if left standing between periods of use. Pastes in tubes and jars dry out, deteriorate due to mold growth, and also need special skill in using and saving which most children do not have. Opaque paint box cakes are slow to work with water, blending is difficult and inconvenient and considerable skill is required for good quality color painting.

The difficulties with these expensive and inconvenient prior paint preparations are eliminated in accordance with the invention which provides improved non-toxic paint compositions in a stable tablet form which avoids the necessity or expense of packaging while providing a complete range of colors for teacher and student and parent and child.

The opaque paint not only requires a homogenous mixture of the constituents of the paint in water but also requires a substantially total freedom from bubbles. The tablets disperse almost instantaneously in small quantities of aqueous liquid without occluded gas, and those not used, stay in a good state of preservation indefinitely.

In the process of making artists' paints it is not desirable to heat the preparation because of deleterious effects on some of the constituents. By my invention, the mixture from which readily dissolvable paint tablets is made is at not time heated to an elevated temperature.

In another embodiment alkali metal borate is combined with starch to provide borated starch, the borate interacting physically and chemically to form a complex and being reactive to disperse the gum binder upon adding water. For example, starch containing alkali metal borate in amounts of from about 5% to about 40% by weight forms borate-starch complex by gentle heating in the presence of water, commerical borated starch preparations may also be employed which contain at least 5% by weight of borate computed as borax in the starch, the amount of water added varying between 8 and 20 cubic cc. for 42 grams dry mixture.

Since the amount of starch which is employed is not substantially different than the amount of borated starch with gum binder, the borated starch provides a reservoir of available free borate for the gum in the presence of water to achieve instant solubilizing.

Other binders may be added to the gums mentioned; for example part (up to 50%) of gum acacia or gum tragacanth may be replaced by methyl cellulose, carboxy methyl cellulose, vinyl pyrrolidone polymer, dextrine, locust bean gum, methyllated starch or similar water dispersible binders.

The preferred alkali metal borate, borax, is a well known buffer material and is effective to solubilize the binder and disperse the pigment in a comparatively wide range. At pH of about 9.0, and in a concentration in water of 1% to 5%, it interacts colloidally with the acacia binder just enough to make it instantly soluble when it is again brought in contact with water; thus contributing to the instant solubility and dispersibility of pigment in the paint tablet.

Borax is an ideal solubilizer and dispersant for pigments in another respect since it contains within it a buffer system that permits the adjustment of pH without itself losing its effectiveness as a solubilizing agent for the gum. For instance, when a 3% solution of borax with a pH rating of around 9 has added to it an acid, as for instance a 4% solution of acetic acid, or a solution of boric acid, and its pH is lowered to as low as pH 6, it still acts efficiently as a solubilizing agent for gum acacia as to contribute to its immediate dissolution when water is added.

A further advantage of this buffer system is that pigments affected by higher alkalinity may still be used with a basic agent such as borax as a dissolving agent, without themselves being affected by the high pH rating of borax.

In Table I below are listed non-toxic pigments and extenders and their characteristic pH values, these pigments and extenders have a particle size in the range of 0.1 to 5.0 parts in diameter. Those pigments having a pH value of less than 7 do not prevent the solubilizing action of the alkali metal borate due to the buffer action indicated above. For improving the dispersibility of pigments having an inherently low pH the adjustment of pH of the alkali metal borate solution to a value of 6 still permits effective and instantaneous solubilization of the binder and color ingredients of the paint tablet while improving the dispersibility of the pigment or extender. For pigments and extenders having inherently high pH values, the alkali metal borate of alkaline reaction is ideally suitable to promote pigment dispersion in the tablet and in water.

TABLE I

| | pH |
|---|---|
| Whites | |
| Lithopone | 7.0 |
| Lithopone, high strength | 8.8 |
| Zinc sulfide | 6.6 |
| Titanium, barium | 7.5 |
| Titanium, calcium | 7.0 |
| Blacks: | |
| Lamp | 3.6 |
| Carbon | 6.8 |
| Graphite | 7.2 |
| Bone | 9.2 |
| Colors: | |
| Tungstated organic green | — |
| Hansa yellow | 7.0 |
| Indian red | 7.3 |
| Iron oxide | 6.0 |
| Para red | 8.0 |
| Zinc chromate | 6.6 |
| Sienna, burnt | 6.6 |
| Umber, raw | 8.0 |
| Extenders: | |
| China clay | 6.8 |
| Blanc fixe | 8.5 |

In the above Table I limited number of pigments are obtained as direct natural products. In this class are the natural earth pigments such as the ochres, siennas, umbers, etc. These natural earth pigments consist mostly of iron oxides, admixed in varying degrees with manganese, other oxides, silicates, etc. The majority of pigments, however, are manufactured. A large number of these consist of insoluble inorganic precipitates, others are produced by solid-gas reactions, and still others by precipitation or mordanting on an inert supporting base. In all cases, a high order of manufacturing control of the various processes has been developed. For the most part, the pigments are insoluble, chemically inert substances. Although the hydrogen-ion concentration of their aqueous dispersions may show values of pH ranging from 3 to 9, more commonly the value approaches pH 7. The amount of water-soluble matter in pigments is of the order of a trace.

Thus, at a lowered pH of pH 6 the borated solution does not seem to alter seriously the effectiveness of borax in contributing to the solubility of the binder. Conversely, pigments affected by acids are quite compatible due to the more basic property of borax.

The following examples are illustrative of the present invention, but are not to be considered as limitative thereof.

EXAMPLE I

*Preparation of White Pigment Water Color Tablet*

This formula illustrates the preparation of a compressed tablet stable even under very humid conditions (90% relative humidity for 24 hours) but which is readily and immediately dispersible in water.

FORMULA A

| | | |
|---|---|---|
| Coloring pigment, titanium dioxide | grams | 4 |
| Extender commercial ground whiting | do | 36 |
| Gum acacia powder | do | 2 |
| Starch powder | do | 2 |
| Sodium tetraborate as 3% borax solution | cc | 10 |

A dry intimate mixture is made of pigment, extender, binder and to this mixture there is added the above volume of weak solution of borax in water. Judging by visual observation alone, the weak solution of borax in contact with gum acacia causes the gum powder to swell and dissolve slightly in the water carrying the borate.

The mixture of pigment, extender and binder, although not saturated with the liquid, appears to "set" under mixing with water in the mixing bowl to form a damp, loose mass of mixed ingredients which are very easily granulated through a sieve. The ingredients are thus continuously mixed with the addition of water to a point where a colloidal effect of swelling of the gum binder becomes apparent.

It is important to note that the concentration of borax in water, and the amount of this solution that is added to the dry mix may vary between about 1%–7% borax concentration in water and between about 5–15 cubic centimeters per 40 grams of the dry mix. A 1% borax solution is substantially as effective as a 3% borax solution but the former requires a longer drying time. On the basis of standardized foolproof commercial operation, a 3% solution is usually ideal for most preparations of dry mix that one wants to produce.

It should be mentioned that the merely increasing of the amount of borax in the solution does not necessarily increase the effectiveness of the borax to promote disintegration of the paint tablets. Beyond a 7% solution some degree of retardation in the dissolving property of the borax appears to take place and the water paint mixture is not as smooth. Further, a 3% solution of borax, in introducing a smaller amount of borax into the final tablet form, raises no question of toxicity while concentrations 3 or 4 times as great might not clearly meet this requirement.

All conditions are thus favored by using the minimum concentration of borax solution, usually as little as 1%–3% aqueous concentration with a maximum amount of this solution being added of up to 20 parts of water to a 42 gram dry mix of pigment, extender, and binder, thereby firmly establishing that these amounts be considered as essentially non-toxic.

After this mixing and setting to a loose damp condition, the mass is put through a No. 40 screen and the granules are then spread out on a flat surface for additional drying at room temperature. Powdered starch in the amount indicated above is added to the dry granules to aid in tableting.

In preparing the pigment and extender, illustratively shown with $TiO_2$ and whiting, respectively, the proportions may vary all the way from about 1.0% pigment–99% extender, e.g., 4 grams of titanium dioxide in 400 grams of whiting but in the formulation above there is 4 grams of $TiO_2$ in a total of 40 grams of pigment-extender mixture in order to show the production of immediately dispersible white water paint having excellent covering power.

The range of the pigment to extender ratio is determined largely by the color intensity of the pigment selected and the intensity of the final paint color which is desired, economical considerations dictating that pigments of high intensity be used in minor proportions and be well blended to give the desired end color and shade. Variations in these proportions do not significantly affect the basic formula nor its success in producing instantly dissolving paint tablets.

The starch treated granules were tableted under pressure of 10,000 pounds per square inch in a commercial tableting machine and provided instantly dissolving paint tablets.

EXAMPLE II

*Preparation of Green Pigment Water Color Tablet*

FORMULA B

Coloring pigment, mixture of 50:50 titanium dioxide and tungstated organic green _____grams__ 20
Extender, blanc fixe _____do____ 20
Gum acacia powder _____do____ ½
Starch powder _____do____ 3
Sodium tetraborate as 3% borax solution _____cc__ 10

A weak solution of borax in water was added to the dry intimate mixture of pigment, extender and binder in the same manner as set forth in Example I above. The paste was mixed to a damp loose granular form which was readily passed through a No. 10, No. 20, No. 30 or No. 40 screen. The finer granules blended very readily, more so than the coarser granules. The granules were spread out for drying at room temperature over night. Powdered starch was then added to the granules. The starch treated granules were tableted under pressure of 16,000 pounds per square inch in a commercial tableting machine and provided instantly dissolving tablets.

The physical characteristics are equivalent in every way, e.g., density, strength, instant dissolving properties in water and freedom from bubbles when liquid to the tablets of Example I.

EXAMPLE III

*Preparation of Red Pigment Water Color Tablet*

FORMULA C

Dry coloring pigment mixture of 50% $Fe_2O_3$ and 50% $TiO_2$ _____grams__ 4
Extender commercial ground whiting and blanc fixe _____grams__ 36
Gum acacia powder_____do____ 2
Starch powder_____do____ 2
Sodium tetraborate as 1% borax solution _____cc__ 15

A weak solution of borax in water was added to the dry intimate mixture of pigment, extender and binder in the same manner as set forth in Example I above. The paste was mixed efficiently to form a loose slightly damp mass which was passed through a No. 30 screen. The screened granules were spread out for drying at room temperature over night. Powdered starch was added to the granules. The starch treated granules were tableted under pressure of 14,000 pounds per square inch in a commercial tableting machine and provided instantly dissolving paint tablets.

The physical characteristics are equivalent in every way, e.g., density, strength, instant dissolving properties in water and freedom from bubbles when liquid to the tablets of Example I.

EXAMPLE IV

*Preparation of Burnt Sienna Pigment Water Color Tablet*

FORMULA D

Dry coloring pigment mixture of 50% sienna and 50% $TiO_2$_____grams__ 4
Extender commercial ground whiting and blanc fixe _____grams__ 36
Gum acacia powder_____do____ 2
Starch powder_____do____ 2
Sodium tetraborate as 1% borax solution _____cc__ 15

A weak solution of borax in water was added to the dry intimate mixture of pigment, extender and binder in the same manner as set forth in Example I above. The paste was mixed to a loose slightly damp granular mass condition and then passed through a No. 20 screen. The screened granules were spread out for drying at room temperature over night. Powdered starch was added to the granules. The starch treated granules were tableted under pressure of 9,000 pounds per square inch in a commercial tableting machine and provided instantly dissolving paint tablets.

The physical characteristics are equivalent in every way, e.g., density, strength, instant dissolving properties in water and freedom from bubbles when liquid to the tablets of Example I.

In the above Examples I–IV, the amount of gum acacia or gum tragacanth which may also be used may vary from (a) about ½ gram of the gum as gum acacia to 40 grams of pigment-extender to as much as (b) 4 grams of gum acacia to 40 grams of pigment-extender depending upon the adhesive character of the paint which is desired. The amount of gum acacia is thus determined largely by its binding property in keeping the pigment-extender particles being well glued to an absorbing material such as paper or canvas.

The amount of borax solution may be as little as 6 cubic centimeters for 42 grams of dry mixture and as much as 20 cubic centimeters, the larger volume being preferably more dilute. The alkali metal tetraborate exemplified is the sodium salt but the potassium, lithium, calcium or other water-soluble alkali metal salts may also be used. The borate anion of the salt includes the anion of boric acid (meta borate), acid of borax (tetraborate), these salts being well known.

Although my preferred method indicates that tablets are the desired form of prepared solid artists' paint colors these paints can also be formed into sticks of uniform thickness by an extrusion step on the paste.

EXAMPLE V

The procedure of Examples I to IV were repeated except that in Example I (Formula A) there were used instead of 2 grams of gum acacia powder, 1 gram of gum acacia powder and 1 gram of dextrine. Similarly in Formula B (Example II) the ½ gram of gum acacia was replaced with ¼ gram of gum acacia and ¼ gram of dextrine, in Formula C (Example III) and in Formula D (Example IV) the 2 grams of gum acacia were replaced with 1 gram of gum acacia and 1 gram of dextrine. In all the foregoing instances the results were the same.

EXAMPLE VI

The procedures of Examples I to V were repeated using gum tragacanth in place of gum acacia. The same results were obtained.

I have described a preferred embodiment but it is apparent that the proportions and amounts of some of the substances can be varied within limits without departing from the spirit of the invention. Accordingly, the invention is to be construed as limited only by the following claims taken in view of the prior art.

I claim:

1. An artist's water paint tablet consisting essentially of (a) a dry mixture of coloring pigment, an extender for said pigment selected from the group consisting of whiting, blanc fixe and clay and finely divided binder selected from the group consisting of gum acacia and gum tragacanth, there being present from about 1.2 to about 10% of binder by weight of said pigment and extender and (b) a dispersing agent for said binder selected from the group consisting of an aqueous solution of an alkali metal borate and aqueous mixture of alkali metal borate treated starch, there being present in said dispersing agent from about 2 to about 40% of alkali metal borate on a dry basis by weight of said binder, said mixture of (a) and (b) being granulated, dried and compressed.

2. An artist's water paint tablet consisting essentially of (a) a dry mixture of coloring pigment, an extender for said pigment selected from the group consisting of whiting, blanc fixe and clay and finely divided binder selected from the group consisting of gum acacia and gum tragacanth, there being present from about 1.2 to about 10% of binder by weight of said pigment and extender, (b) a dispersing agent for said binder selected from the group consisting of an aqueous solution of an alkali metal borate and aqueous mixture of alkali metal borate treated starch, there being present in said dispersing agent from about 2 to about 40% of alkali metal borate on a dry basis by weight of said binder and (c) starch in an amount of from about 2% to about 8% based upon the weight of said pigment and binder, said mixture of (a), (b) and (c) being granulated, dried and compressed and said starch serving as an aid for disintegrating said compressed mixture in tablet form when the tablet is broken up and mixed with water.

3. An artist's water paint tablet as claimed in claim 2 wherein said dispersing agent is borax which is present as a solution in water varying from about 1% to about 7% and the amount of said solution added to said dry mixture of pigment extender and binder is between about 6 to about 20 cubic centimeters per 42 grams of said dry mixture.

4. An artist's water paint tablet as claimed in claim 2 wherein said extender is whiting.

5. An artist's water paint tablet as claimed in claim 2 wherein said dispersing agent is borated starch containing from about 3 to about 40% of alkali metal borate by weight of said starch, the total amount of starch present being less than 8% by weight based upon the weight of said pigment and binder.

6. An artist's water paint tablet as claimed in claim 2 wherein said extender is clay.

7. An artist's water tablet as claimed in claim 2 wherein said extender is blanc fixe.

8. An artist's water tablet as claimed in claim 5 wherein said dispersing agent is borax.

9. A method of preparing an artist's water paint tablet comprising admixing in dry finely divided form coloring pigment, extender selected from the group consisting of whiting, blanc fixe and clay, finely divided binder selected from the group consisting of gum acacia and gum tragacanth in an amount of from about 1.2 to about 8% by weight of pigment and extender, adding to said dry mixture an alkali metal borate dispersing agent in an amount as dry borate of from about 2 to about 40% dry weight of said binder in the presence of water and starch in an amount of from about 2% to about 8% based upon the weight of said pigment and binder while mixing to cause said binder to swell, drying and granulating the mixture at room temperature and tableting the mixture at elevated pressure.

10. A method as claimed in claim 9 wherein starch is added after drying and granulating and before tableting to assist the ease of disintegration of said tablet when it is mixed with water.

11. A method as claimed in claim 9 wherein said alkali metal borate is in the form of borax in 1%–7% aqueous solution which is treated with an alkali borate selected from the group consisting of sodium tetraborate and potassium tetraborate.

12. A method as claimed in claim 9 wherein said alkali metal borate is borated starch in water, the borate in said starch as alkali metal borate being present as 1%–7% aqueous borate solution.

References Cited in the file of this patent

UNITED STATES PATENTS

| | | |
|---|---|---|
| 2,822,281 | Masley | Feb. 4, 1958 |
| 2,938,809 | Katzbeck | May 31, 1960 |